US012662055B2

(12) United States Patent
      Prior

(10) Patent No.: US 12,662,055 B2
(45) Date of Patent: Jun. 23, 2026

(54) ACCESSORY STEPS FOR VEHICLE CLOSURE MEMBERS

(71) Applicant: FORD GLOBAL TECHNOLOGIES, LLC, Dearborn, MI (US)

(72) Inventor: Joseph Prior, Detroit, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 315 days.

(21) Appl. No.: 18/527,809

(22) Filed: Dec. 4, 2023

(65) Prior Publication Data

US 2025/0178537 A1      Jun. 5, 2025

(51) Int. Cl.
     B60R 3/00           (2006.01)
(52) U.S. Cl.
     CPC .................................... B60R 3/007 (2013.01)
(58) Field of Classification Search
     CPC .. B60R 3/007; B60R 3/00; B60R 3/02; B60R 3/005; B62D 43/02
     See application file for complete search history.

(56) References Cited

U.S. PATENT DOCUMENTS

| | | | | |
|---|---|---|---|---|
| 4,019,664 A | * | 4/1977 | Weiler | B62D 43/02 |
| | | | | 224/401 |
| 4,222,136 A | * | 9/1980 | Valentino | A61G 7/053 |
| | | | | 5/507.1 |
| 4,342,278 A | | 8/1982 | Horan | |
| 4,605,098 A | * | 8/1986 | Leuty | B60R 3/007 |
| | | | | 182/92 |

| | | | | |
|---|---|---|---|---|
| 4,911,264 A | * | 3/1990 | McCafferty | B25H 5/00 |
| | | | | 182/62 |
| 4,947,961 A | * | 8/1990 | Dudley | B60R 3/007 |
| | | | | 280/165 |
| 5,799,961 A | * | 9/1998 | Schmeets | E06C 5/00 |
| | | | | 280/169 |
| 5,884,824 A | | 3/1999 | Spring, Jr. | |
| 5,887,540 A | * | 3/1999 | Krish, Jr. | B63B 27/14 |
| | | | | 114/362 |
| 6,578,666 B1 | * | 6/2003 | Miller | E06C 1/36 |
| | | | | 182/127 |
| 6,767,023 B1 | * | 7/2004 | Nicholson | B60R 3/007 |
| | | | | 280/165 |

(Continued)

FOREIGN PATENT DOCUMENTS

| | | | | |
|---|---|---|---|---|
| CA | 2971479 A1 | * | 12/2017 | |
| CN | 108162868 A | * | 6/2018 | B60R 3/02 |

(Continued)

OTHER PUBLICATIONS

Translated CN-108162868-A (Year: 2025).*
Translated KR-200475608-Y1 (Year: 2025).*

*Primary Examiner* — James A Shriver, II
*Assistant Examiner* — Ian Bryce Shelton
(74) *Attorney, Agent, or Firm* — Vichit Chea; Carlson, Gaskey & Olds, P.C.

(57)                    ABSTRACT

Accessory steps are provided for use on motor vehicles during stationary or non-moving conditions of the vehicle. Exemplary accessory steps may include a step portion and a hook portion. The step portion may be configured to provide a step surface for a user to step on in order to access an upper vehicle structure. The hook portion may be configured to engage a hinge assembly of a closure member system of the stationary motor vehicle.

20 Claims, 4 Drawing Sheets

(56) References Cited

U.S. PATENT DOCUMENTS

| | | | | |
|---|---|---|---|---|
| 6,796,466 | B2 * | 9/2004 | Essig | B62D 43/02 |
| | | | | 224/42.21 |
| 7,131,516 | B1 * | 11/2006 | Krol | E02B 3/20 |
| | | | | 182/206 |
| 7,168,523 | B1 * | 1/2007 | Tafoya | B60R 3/007 |
| | | | | 280/165 |
| 8,038,164 | B2 | 10/2011 | Stahl et al. | |
| 9,073,486 | B1 | 7/2015 | Meszaros et al. | |
| 9,120,426 | B1 | 9/2015 | Huebner et al. | |
| 9,623,803 | B1 | 4/2017 | Martins | |
| 9,821,716 | B1 | 11/2017 | Hernandez | |
| 10,106,086 | B1 | 10/2018 | Eckstein et al. | |
| 10,227,097 | B2 * | 3/2019 | Smith | B62D 65/16 |
| 10,435,088 | B2 * | 10/2019 | Smith | B62D 65/16 |
| 10,843,631 | B1 * | 11/2020 | Honeysett | B60R 3/02 |
| 11,623,582 | B2 * | 4/2023 | Bennett | E05D 5/0207 |
| | | | | 248/213.1 |
| 12,252,096 | B2 * | 3/2025 | McNeely | B60R 3/00 |
| 2002/0084298 | A1 * | 7/2002 | Essig | B62D 43/02 |
| | | | | 224/42.21 |
| 2006/0157301 | A1 * | 7/2006 | Embretsen | E06C 7/081 |
| | | | | 182/150 |
| 2006/0272895 | A1 * | 12/2006 | Lavoie | B60R 3/02 |
| | | | | 182/127 |
| 2007/0273177 | A1 | 11/2007 | Sankrithi et al. | |
| 2009/0159108 | A1 | 6/2009 | Dannewitz | |
| 2010/0122871 | A1 * | 5/2010 | Gottlinger | E06C 5/02 |
| | | | | 182/106 |
| 2012/0055967 | A1 | 3/2012 | McMillan | |
| 2013/0241176 | A1 | 9/2013 | Dempsey et al. | |
| 2014/0131405 | A1 | 5/2014 | Noonan | |
| 2017/0369108 | A1 * | 12/2017 | Smith | B62D 43/02 |
| 2019/0270487 | A1 * | 9/2019 | Smith | B62D 43/02 |
| 2019/0376309 | A1 | 12/2019 | Montesalvo | |
| 2022/0282515 | A1 | 9/2022 | Currid | |
| 2023/0009100 | A1 * | 1/2023 | McNeely | B60R 3/00 |
| 2023/0339405 | A1 * | 10/2023 | Lewis | B60R 3/007 |
| 2024/0190352 | A1 * | 6/2024 | Hasner | B60R 3/00 |
| 2024/0400140 | A1 * | 12/2024 | Vandervoord | B62D 33/027 |

FOREIGN PATENT DOCUMENTS

| | | | | | |
|---|---|---|---|---|---|
| CN | 111924017 | A | * 11/2020 | | B62D 43/02 |
| CN | 114919500 | A | * 8/2022 | | B60R 3/007 |
| EP | 2774816 | B1 | 9/2015 | | |
| GB | 2339562 | A | * 2/2000 | | B62D 43/02 |
| KR | 200475608 | Y1 | * 12/2014 | | B60R 9/00 |
| WO | 2021123705 | A1 | 6/2021 | | |

* cited by examiner

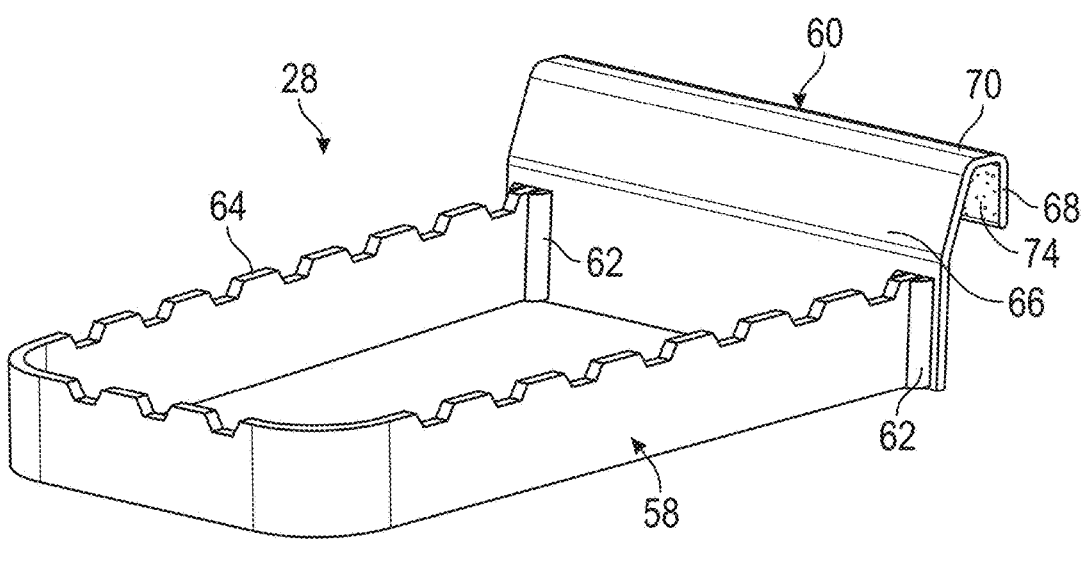
FIG. 7
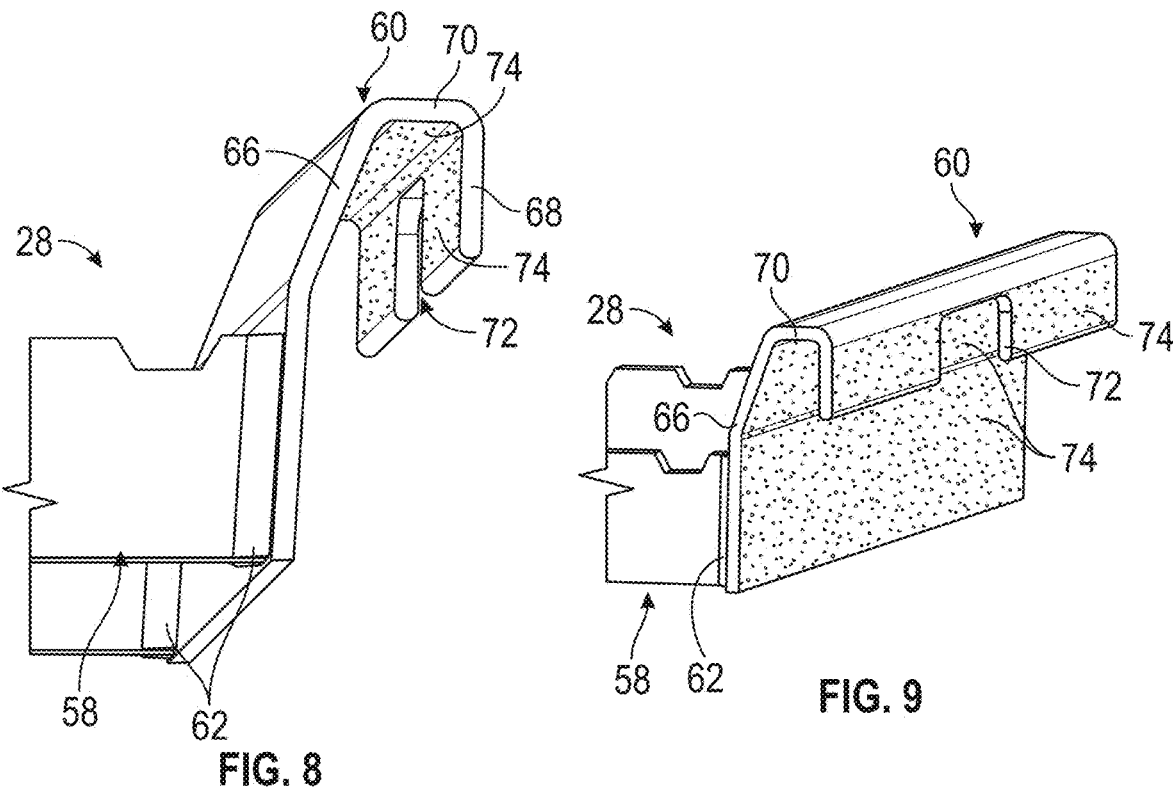
FIG. 8
FIG. 9

ACCESSORY STEPS FOR VEHICLE CLOSURE MEMBERS

TECHNICAL FIELD

This disclosure relates to motor vehicles, and more particularly to accessory steps that can be connected to a vehicle closure member system for accessing roof mounted cargo while the vehicle is stationary.

BACKGROUND

Motor vehicles typically include one or more closure members. Exemplary closure members are doors and swing gates. Generally, closure members can be moved between open and closed positions relative to a body structure of the vehicle in order to provide vehicle ingress/egress.

SUMMARY

An accessory step for a motor vehicle, according to an exemplary aspect of the present disclosure includes, among other things, a step portion and a hook portion connected to the step portion. The hook portion is configured to engage a hinge assembly of a closure member system of a stationary motor vehicle.

In a further non-limiting embodiment of the foregoing accessory step, the hook portion is connected to the step portion by at least one weld.

In a further non-limiting embodiment of either of the foregoing accessory steps, the hook portion is configured to hook onto a hinge bracket of the hinge assembly.

In a further non-limiting embodiment of any of the foregoing accessory steps, the hook portion is received within a recess of an interior surface of the hinge bracket.

In a further non-limiting embodiment of any of the foregoing accessory steps, the recess extends between a first mounting pad and a second mounting pad of the interior surface of the hinge bracket.

In a further non-limiting embodiment of any of the foregoing accessory steps, the hook portion includes a cut-out sized to accommodate the first mounting pad or the second mounting pad.

In a further non-limiting embodiment of any of the foregoing accessory steps, the hinge bracket is a door-side hinge bracket of the hinge assembly.

In a further non-limiting embodiment of any of the foregoing accessory steps, the hook portion is configured to engage the hinge assembly without using fasteners.

In a further non-limiting embodiment of any of the foregoing accessory steps, the step portion includes an upper surface that is configured to provide a step surface.

In a further non-limiting embodiment of any of the foregoing accessory steps, the upper surface includes a plurality of ridges and valleys.

In a further non-limiting embodiment of any of the foregoing accessory steps, the hook portion includes a first hook section, a second hook section, and a bridge section that connects between the first hook section and the second hook section.

In a further non-limiting embodiment of any of the foregoing accessory steps, the first hook section is configured to interface with an exterior surface of the hinge assembly, the second hook section is configured to interface with an interior surface of the hinge assembly, and the bridge section is configured to interface with an upper horizontal surface of the hinge assembly.

In a further non-limiting embodiment of any of the foregoing accessory steps, a portion of each of the first hook section, the second hook section, and the bridge section includes a protective lining.

A vehicle closure member system according to another exemplary aspect of the present disclosure includes, among other things, a closure member, a first hinge assembly mounted to the closure member, and an accessory step removably mountable to the first hinge assembly without using fasteners.

In a further non-limiting embodiment of the foregoing vehicle closure member system, the closure member is a rear swing gate.

In a further non-limiting embodiment of either of the foregoing vehicle closure member systems, the first hinge assembly includes a body-side hinge bracket mounted to a vehicle body and a door-side hinge bracket mounted to the closure member.

In a further non-limiting embodiment of any of the foregoing vehicle closure member systems, the accessory step is configured to hook onto the door-side hinge bracket.

In a further non-limiting embodiment of any of the foregoing vehicle closure member systems, the accessory step includes a step portion and a hook portion connected to the step portion.

In a further non-limiting embodiment of any of the foregoing vehicle closure member systems, the hook portion is configured to engage a hinge bracket of the first hinge assembly.

A method for providing an accessory step on a stationary motor vehicle, according to another exemplary aspect of the present disclosure includes, among other things, hooking an accessory step onto a hinge bracket of a closure member system of the stationary motor vehicle.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

BRIEF DESCRIPTION OF THE DRAWINGS

FIG. 7 is a perspective view of an accessory step.

FIG. 8 is a side perspective view of a hook portion of the accessory step of FIG. 7.

FIG. 9 is a rear perspective view of the hook portion of the accessory step of FIG. 7.

DETAILED DESCRIPTION

This disclosure details exemplary accessory steps for use with closure member systems of a motor vehicle during stationary or non-moving conditions of the vehicle. Exemplary accessory steps may include a step portion and a hook portion. The step portion may be configured to provide a step surface for a user to step on in order to access an upper vehicle structure of the stationary motor vehicle. The hook portion may be configured to engage a hinge assembly of a closure member system of the stationary motor vehicle. These and other features of this disclosure are described in greater detail below.

Figure 1:
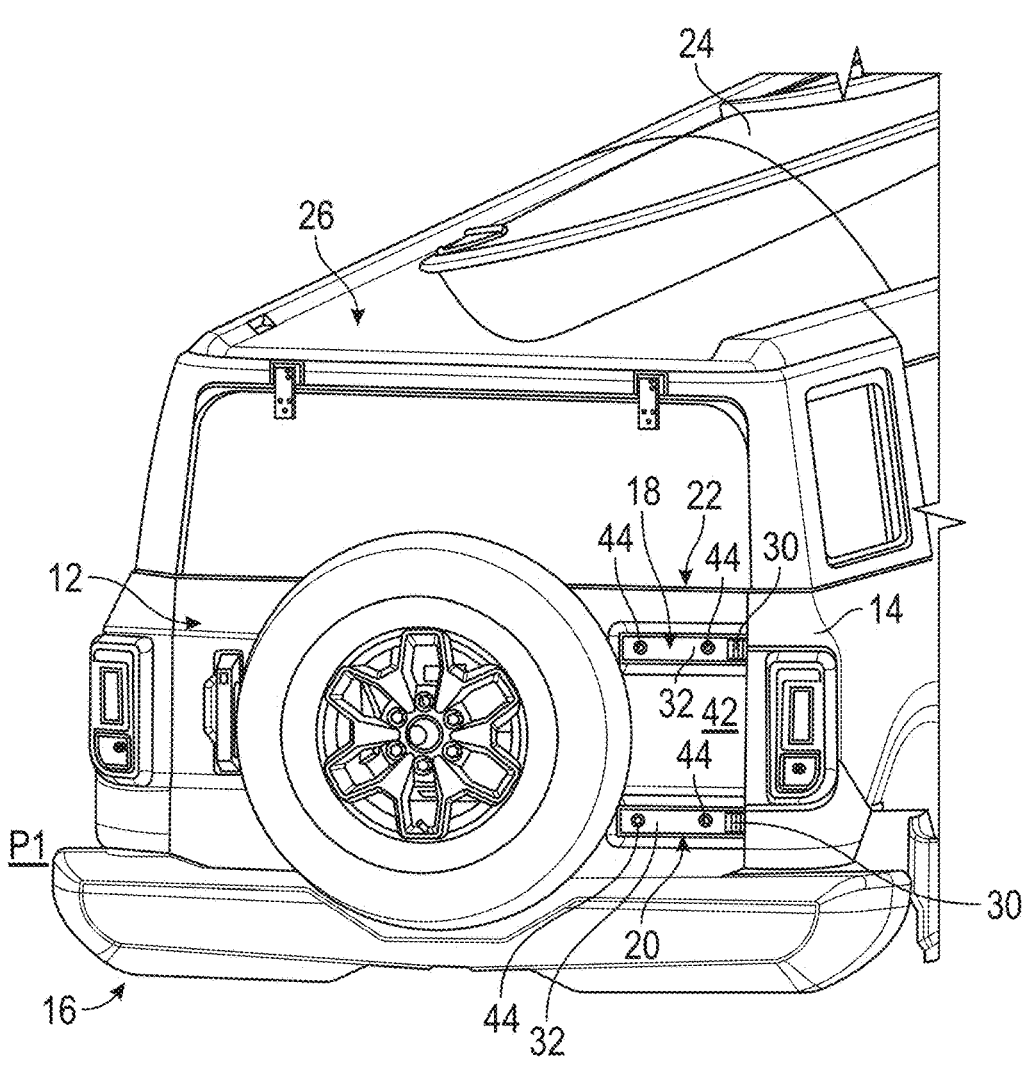
FIG. 1 illustrates a motor vehicle equipped with a closure member system. The closure member system is shown in a closed position in FIG. 1.
Figure 2:
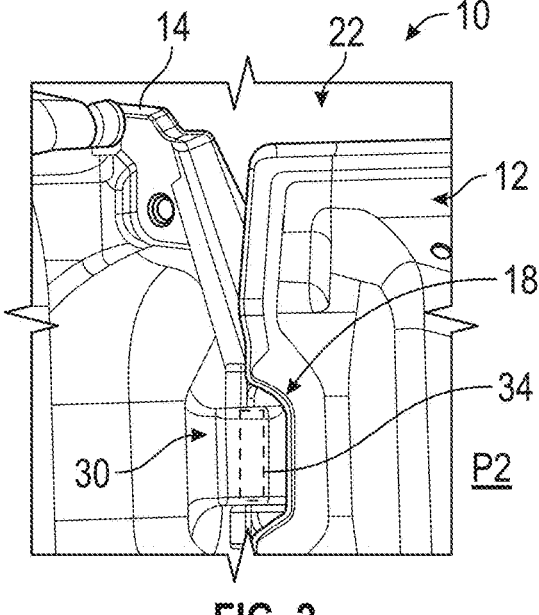
FIG. 2 illustrates an open position of the closure member system of FIG. 1.

FIGS. 1 and 2 schematically illustrate select portions of a motor vehicle 10 (hereinafter referred to simply as "vehicle"). The vehicle 10 may be a car, a truck, a van, a sport utility vehicle, a semi tractor-trailer, or any other type of vehicle. The vehicle 10 could also be a conventional motor vehicle, a traction battery powered hybrid or electric vehicle, or an autonomous vehicle (i.e., a driverless vehicle).

Although a specific component relationship is illustrated in the figures of this disclosure, the illustrations are not intended to limit this disclosure. In other words, the placement and orientation of the various components of the vehicle 10 are shown schematically and could vary within the scope of this disclosure. In addition, the various figures accompanying this disclosure are not necessarily drawn to scale, and some features may be exaggerated or minimized to emphasize certain details of a particular component, assembly, or system.

The vehicle 10 may include one or more closure members 12 that are mounted relative to a vehicle body 14 and configured to move between closed and open positions for accessing a vehicle interior (e.g., a cargo space, a passenger cabin, etc.). In the illustrated embodiment, the closure member 12 is mounted at a rear 16 of the vehicle 10 and is configured as a swing gate. In other implementations, the closure member 12 could be part of a dual out-swinging door system that may be provided at the rear 16 of the vehicle 10 for gaining access to the vehicle interior, such as for loading and/or unloading cargo, for example. However, the teachings of this disclosure are not limited to swing gates and rear out-swinging type doors and could apply to various other types of closure members, including but not limited to side doors, tailgates, etc.

The closure member 12 may be movably mounted to the vehicle body 14 by a first hinge assembly 18 and a second hinge assembly 20. The first and second hinge assemblies 18, 20 may movably support the closure member 12 relative to the vehicle body 14. Together, the closure member 12, the first hinge assembly 18, and the second hinge assembly 20 may establish a closure member system 22 of the vehicle 10. Although two hinge assemblies are illustrated in the exemplary embodiment, the closure member system 22 could include a greater or fewer number of hinge assemblies.

The first hinge assembly 18 may be mounted at a location of the closure member 12 that is vertically above the second hinge assembly 20. However, other configurations could be possible within the scope of this disclosure. Vertical and horizontal, for purposes of this disclosure, are with reference to ground in an ordinary orientation of the vehicle 10 during operation.

In an embodiment, the first hinge assembly 18 and the second hinge assembly 20 are visible when the closure member 12 is closed. The first and second hinge assemblies 18, 20 may therefore be considered exposed or "Class A" type hinge assemblies.

The design of the second hinge assembly 20 may be substantially identical to that of the first hinge assembly 18. Therefore, for the purposes of this disclosure, details described herein related to the first hinge assembly 18 should be understood to apply equally to the second hinge assembly 20.

The closure member 12 is shown in a closed position P1 in FIG. 1 and in an open position P2 in FIG. 2. When moved to the open position P2, the closure member 12 permits users to access the vehicle interior. When closed, the closure member 12 provides a barrier between the interior and the exterior of the vehicle 10. Although not specifically shown, the closure member 12 may be moved to various angular positions between the closed position P1 and the open position P2.

In an embodiment, the closure member 12 is angularly displaced relative to the vehicle body 14 by about 100° or more when moved to the open position P2 of FIG. 2. In this disclosure, the term "about" means that the expressed quantities or ranges need not be exact but may be approximated and/or larger or smaller, reflecting acceptable tolerances, conversion factors, measurement error, etc. A total range of motion of the closure member 12 may vary and is dependent on various design criteria.

A user of the vehicle 10 may desire to secure one or more objects 24 atop a roof 26 of the vehicle 10. The object(s) 24 could include cargo (e.g., long stock (e.g., lumber), boats, kayaks, lawn tools, etc.) that the owner of the vehicle 10 desires to haul on the roof 26 or could include a tent or other equipment that the user desires to use while leveraging the roof 26 for camping-related activities. Some users may find it difficult to access the roof 26 without the use of a ladder or similar height assisting device. However, ladders can be large and cumbersome to carry and maneuver. This disclosure is therefore directed to accessory steps that can be utilized in combination with the closure member system 22 for facilitating access to the roof 26 and/or other upper vehicle structures while the vehicle 10 is stationary or non-moving.

FIGS. 3, 4, 5, and 6, with continued reference to FIGS. 1 and 2, illustrate details associated with an accessory step 28 that can be removably mounted to the closure member system 22 for facilitating access to the roof 26 while the vehicle 10 is in a stationary, non-moving condition. Notably, the accessory step(s) 28 can be mounted to the closure member system 22 without using fasteners (i.e., bolts, screws, etc.). Although two accessory steps 28 are shown in the exemplary figures, it should be understood that one or more accessory steps 28 can be mounted to the closure member system 22 for facilitating access to the roof 26.

The accessory step 28 may be configured to engage the first hinge assembly 18 or the second hinge assembly 20 in order to mount the accessory step to the closure member system 22. The first hinge assembly 18 and the second hinge assembly 20 of the closure member system 22 may each include a body-side hinge bracket 30 and a door-side hinge bracket 32. The door-side hinge bracket 32 may be pivotably connected to the body-side hinge bracket 30 by a pivot pin 34 (see, e.g., FIG. 4).

Figures 3, 4:
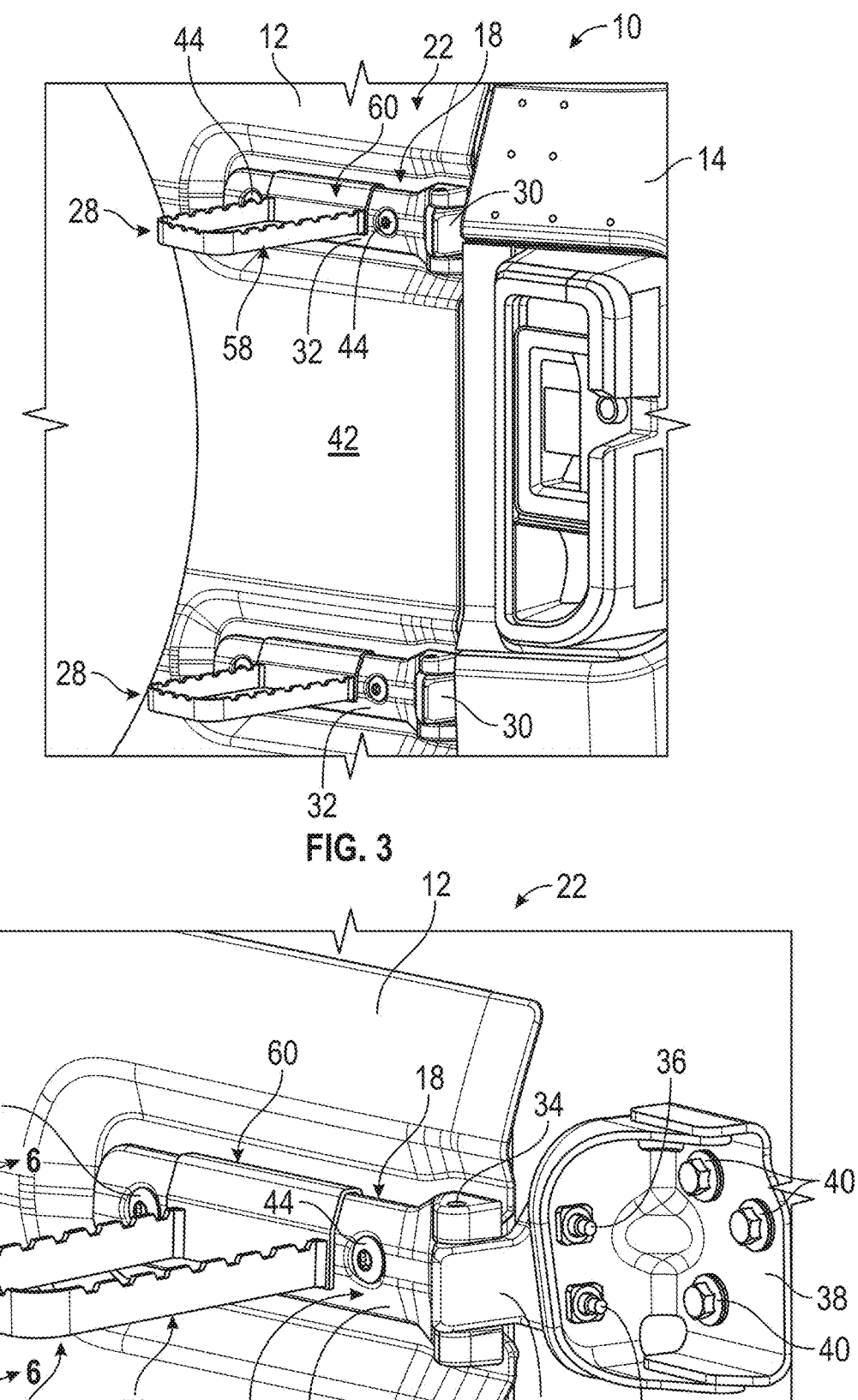
FIG. 3 is a blown up view illustrating select portions of a vehicle closure member system. One or more accessory steps can be removably mounted to the vehicle closure member system.
FIG. 4 illustrates an accessory step mounted to a vehicle closure member system.
Figure 5:
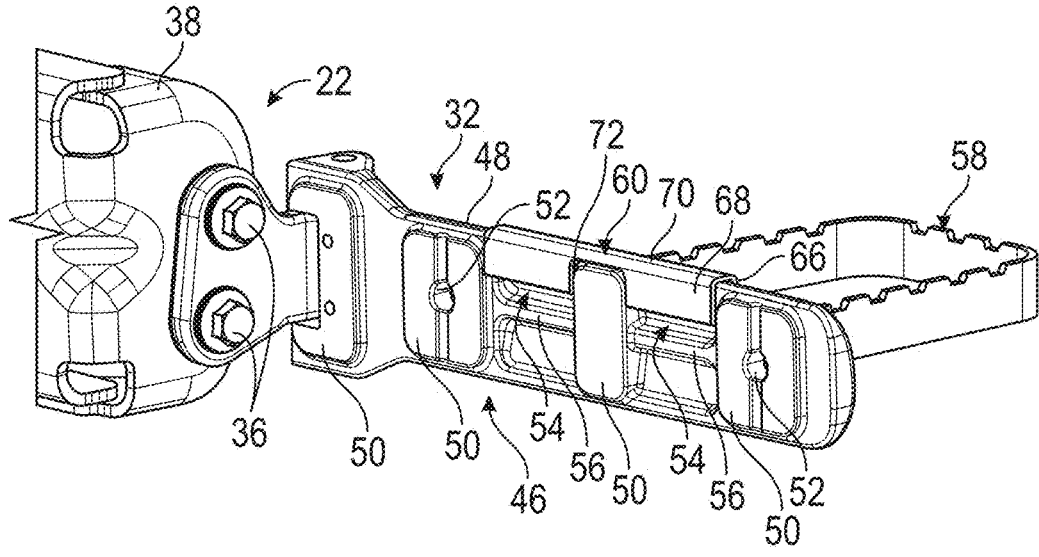
FIG. 5 is a rear view of select portions of the closure member system of FIG. 4.

The body-side hinge bracket 30 may be mounted relative to the vehicle body 14 by one or more mechanical fasteners 36 (see FIGS. 4-5). In an embodiment, the mechanical fasteners 36 secure the body-side hinge bracket 30 to a hinge attach bracket 38. The hinge attach bracket 38 may be secured to another component of the vehicle body 14 by one or more additional mechanical fasteners 40 (see FIG. 4) for securing the body-side hinge bracket 30 relative to the vehicle body 14.

The door-side hinge bracket 32 may be mounted to an exterior surface 42 of the closure member 12 by one or more mechanical fasteners 44 (best shown in FIGS. 1, 3, and 4). The exterior surface 42 may be referred to as the "class A-surface" of the closure member 12.

Figure 6:
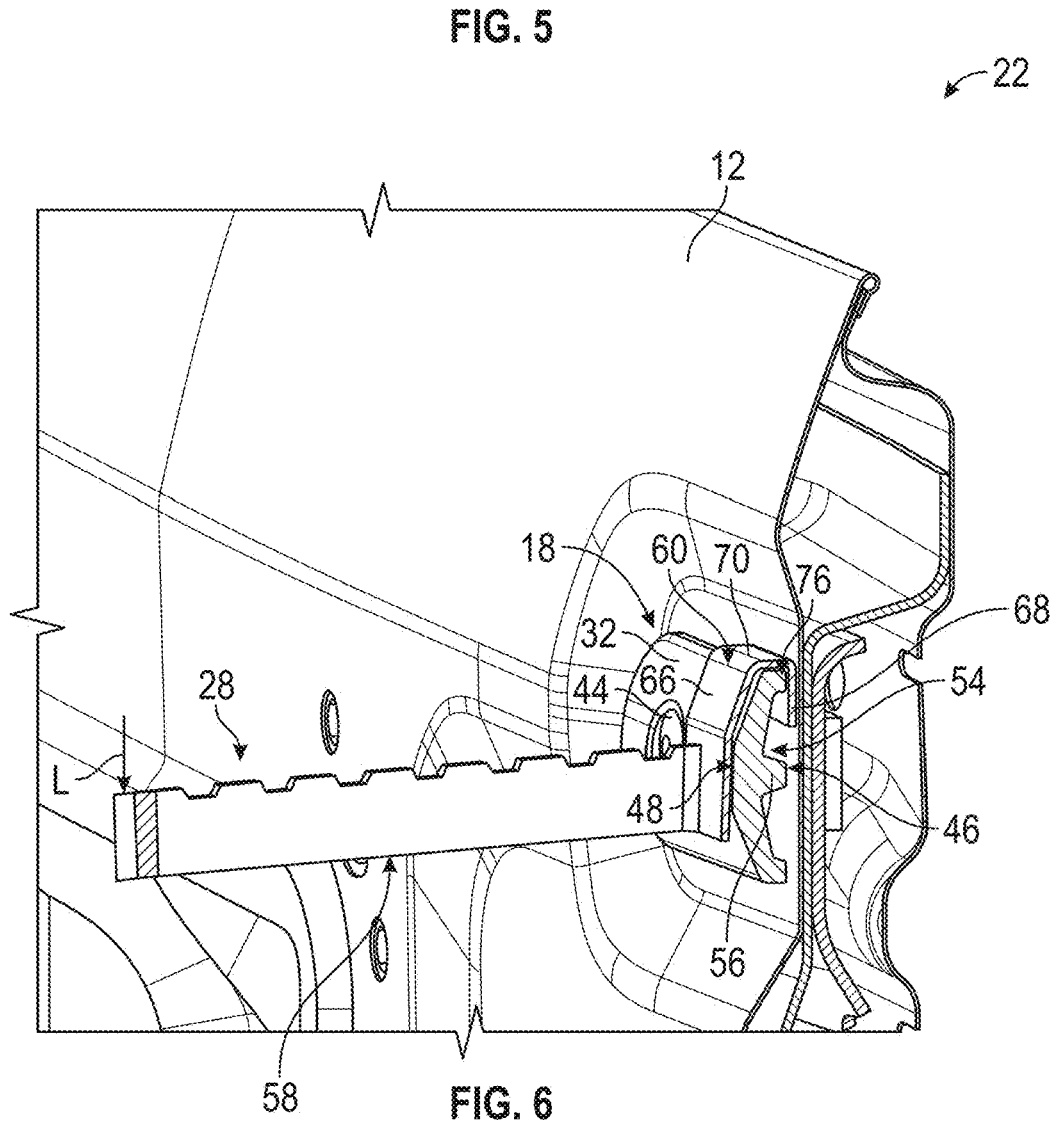
FIG. 6 is a cross-sectional view through section 5-5 of FIG. 4.

As best shown in FIGS. 5-6, the door-side hinge bracket 32 may include an interior surface 46 that faces in a direction toward the exterior surface 42 of the closure member 12 and an exterior surface 48 that faces in a direction away from the exterior surface 42 of the closure member 12 when mounted to the closure member 12. The interior surface 46 may include a plurality of mounting pads 50 that are designed to interface with the exterior surface 42 of the closure member 12. An opening 52 may be formed through at least a portion of the mounting pads 50. The openings 52 are sized to receive one of the mechanical fasteners 44 for mounting the door-side hinge bracket 32 to the closure member 12.

Recesses 54 may be formed in the interior surface 46 of the door-side hinge bracket 32. The recesses 54 may extend from the interior surface 46 in a direction toward the exterior surface 48 of the door-side hinge bracket 32. One or more of the recesses 54 can be disposed between adjacent pairs of the mounting pads 50. The recesses 54 create open spaces between the door-side hinge bracket 32 and the exterior surface 42 of the closure member 12 for allowing the accessory step 28 to hook or glove onto the door-side hinge bracket 32 without using any additional fasteners.

The interior surface 46 of the door-side hinge bracket 32 may additionally include one or more stiffening ribs 56 for increasing the strength and stiffness of the door-side hinge bracket 32. One or more of the stiffening ribs 56 can extend within each recess 54 between adjacent pairs of the mounting pads 50. However, the specific configuration of the stiffening ribs 56 is not intended to limit this disclosure.

Referring now to FIGS. 7-9, with continued reference to FIGS. 3-6, the accessory step 28 may include a step portion 58 and a hook portion 60 that is connected to the step portion 58. In an embodiment, the hook portion 60 is connected to the step portion 58 by one or more welds 62 to establish a single-piece integrated structure of the accessory step 28.

The step portion 58 of the accessory step 28 may include an upper surface 64 that is configured to provide a step surface for a user to step on for gaining access to the roof 26 when the vehicle 10 is stationary and the accessory step 28 has been connected to the door-side hinge bracket 32. The upper surface 64 of the step portion 58 may include a plurality of ridges separated by valleys or some other textured surface for providing stepping traction.

The hook portion 60 of the accessory step 28 is configured to engage the door-side hinge bracket 32 and may include a first hook section 66, a second hook section 68, and a bridge section 70 that connects between the first hook section 66 and the second hook section 68. When the accessory step 28 is secured to the door-side hinge bracket 32, the first hook section 66 may interface with the exterior surface 48, the second hook section 68 may interface with the interior surface 46, and the bridge section 70 may interface with an upper horizontal surface 76 (see FIG. 6) of the door-side hinge bracket 32. When a vertical step load L is applied to the step portion 58, the load may be transferred to both the upper horizontal surface 76 and the exterior surface 48 of the door-side hinge bracket 32, thereby better distributing the load across the door-side hinge bracket 32.

The second hook section 68 may be accommodated within the recesses 54 of the interior surface 46 to allow the hook portion 60 to hook or glove onto the door-side hinge bracket 32. The second hook section 68 may include one or more cut-outs 72 for accommodating one or more of the mounting pads 50 of the door-side hinge bracket 32.

A protective lining 74 may be provided on select portions of the hook portion 60 for protecting the respective surface finishes of the door-side hinge bracket 32 and the closure member 12 by eliminating metal-to-metal contact. The protective lining 74 may be provided on an inner surface of the first hook section 66, an inner surface of the bridge section 70, and both an inner surface and an outer surface of the second hook section 68. In an embodiment, the protective lining 74 is a rubber (e.g., ethylene propylene diene monomer rubber) layer that is adhered to the hook portion 60. However, other configurations are contemplated within the scope of this disclosure.

When not needed, the accessory step 28 can be disconnected from the door-side hinge bracket 32 of the first hinge assembly 18 or the second hinge assembly 20 and then stored within the vehicle 10. The accessory step 28 can be stored at any suitable location inside the vehicle 10, including within any suitable storage bin of the passenger cabin or cargo area, for example.

The accessory steps described herein facilitate increased access to and utilization of vehicle roofs and/or other upper vehicle structures. The proposed steps can therefore eliminate the need for large, cumbersome ladders in order to access upper vehicle structures. The proposed accessory steps can easily hook or glove onto closure member hinges without requiring additional fasteners, thereby enabling fast and convenient usage.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. An accessory step for a motor vehicle, comprising:
   a step portion; and
   a hook portion connected to the step portion,
   wherein the hook portion is configured to engage a hinge bracket of a hinge assembly of a closure member system of a stationary motor vehicle such that a first hook section of the hook portion interfaces with an exterior surface of the hinge bracket, a second hook section of the hook portion interfaces with an interior surface of the hinge bracket, and a bridge section of the hook portion interfaces with an upper surface of the hinge bracket.

2. The accessory step as recited in claim 1, wherein the hook portion is connected to the step portion by at least one weld.

3. The accessory step as recited in claim 1, wherein the hook portion is configured to hook onto the hinge bracket of the hinge assembly.

4. The accessory step as recited in claim 3, wherein the hook portion is received within a recess of the interior surface of the hinge bracket.

5. The accessory step as recited in claim 4, wherein the recess extends between a first mounting pad and a second mounting pad of the interior surface of the hinge bracket.

6. An accessory step for a motor vehicle, comprising:

a step portion; and a hook portion connected to the step portion, wherein the hook portion is configured to engage a hinge assembly of a closure member system of a stationary motor vehicle, wherein the hook portion is configured to hook onto a hinge bracket of the hinge assembly, wherein the hook portion is received within a recess of an interior surface of the hinge bracket, wherein the recess extends between a first mounting pad and a second mounting pad of the interior surface of the hinge bracket, and wherein the hook portion includes a cut-out sized to accommodate the first mounting pad or the second mounting pad.

7. The accessory step as recited in claim 3, wherein the hinge bracket is a door-side hinge bracket of the hinge assembly.

8. The accessory step as recited in claim 1, wherein the hook portion is configured to engage the hinge assembly without using fasteners.

9. The accessory step as recited in claim 1, wherein the step portion includes an upper surface that is configured to provide a step surface.

10. The accessory step as recited in claim 9, wherein the upper surface includes a plurality of ridges and valleys.

11. The accessory step as recited in claim 1, wherein a portion of each of the first hook section, the second hook section, and the bridge section includes a protective lining.

12. A vehicle closure member system, comprising:

a closure member;

a first hinge assembly including a door-side hinge bracket mounted to the closure member; and an accessory step sized to hook onto the door-side hinge bracket without using fasteners.

13. The vehicle closure member system as recited in claim 12, wherein the closure member is a rear swing gate.

14. The vehicle closure member system as recited in claim 12, wherein the first hinge assembly further includes a body-side hinge bracket mounted to a vehicle body.

15. The vehicle closure member system as recited in claim 12, wherein the accessory step includes a step portion and a hook portion connected to the step portion.

16. The vehicle closure member system as recited in claim 15, wherein the hook portion is configured to directly engage the door-side hinge bracket of the first hinge assembly.

17. A method for providing an accessory step on a stationary motor vehicle, comprising:

hooking an accessory step onto a hinge bracket of a closure member system of the stationary motor vehicle so that a hook section of the accessory step is received between an exterior surface of a closure member of the closure member system and an interior surface of the hinge bracket.

18. The method as recited in claim 17, wherein the hook section is configured to receive a mounting pad of the interior surface of the hinge bracket.

19. The vehicle closure member system as recited in claim 12, wherein a first hook section of the accessory step interfaces with an exterior surface of the door-side hinge bracket, a second hook section of the accessory step interfaces with an interior surface of the door-side hinge bracket, and a bridge section of the accessory step interfaces with an upper surface of the door-side hinge bracket.

20. The vehicle closure member system as recited in claim 12, wherein the door-side hinge bracket is an exposed, Class A hinge bracket that is visible when the closure member is closed.

* * * * *